United States Patent [19]

Diggs

[11] 4,053,787
[45] Oct. 11, 1977

[54] MODULAR HYDROELECTRIC POWER PLANT

[76] Inventor: Richard E. Diggs, S. 12A Road, P.O. Box 776, Carthage, Mo. 64836

[21] Appl. No.: 625,177

[22] Filed: Oct. 23, 1975

[51] Int. Cl.² .............................................. F03B 13/00
[52] U.S. Cl. ........................................ 290/54; 290/43
[58] Field of Search .................. 290/43, 54, 42, 53; 60/398; 61/22 R, 22 A, 28, 29, 30, 64, 63; 415/3, 4; 417/334, 336

[56] References Cited

U.S. PATENT DOCUMENTS

| | | | |
|---|---|---|---|
| 1,487,391 | 3/1924 | Köchlin | 61/30 |
| 1,529,824 | 3/1925 | Adelmann | 60/398 |
| 3,287,918 | 11/1966 | Stewart | 61/28 |
| 3,746,875 | 7/1973 | Donatelli | 290/43 |
| 3,993,913 | 11/1976 | Dickman | 290/53 |

*Primary Examiner*—Robert K. Schaefer
*Assistant Examiner*—Michael K. Mutter
*Attorney, Agent, or Firm*—Shoemaker and Mattare, Ltd.

[57] ABSTRACT

A modular hydroelectric power plant which converts energy of water flowing in a stream into electric power. The plant comprises a plurality of modules which are removably mounted on piers embedded in a river or stream bed. Each module comprises a turbine over which water flows to rotate the turbine, and turbine rotation is converted into power by a generator attached thereto. The generator is removably mounted on the module. Insertion of the plant in a stream or river does not significantly disrupt flow therein, and locks are provided to assist vehicles in transversing the plant area of the river or stream.

15 Claims, 10 Drawing Figures

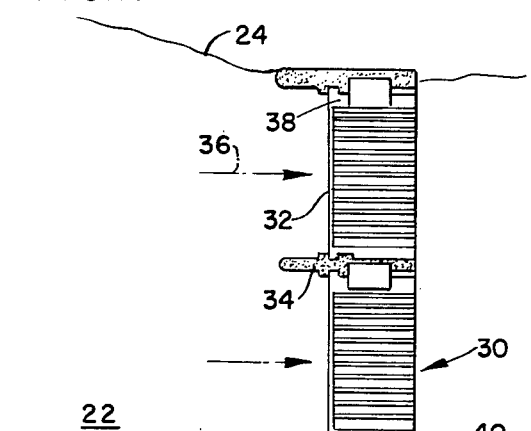
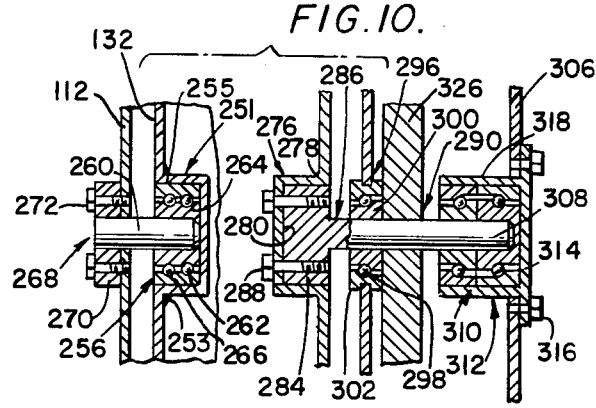
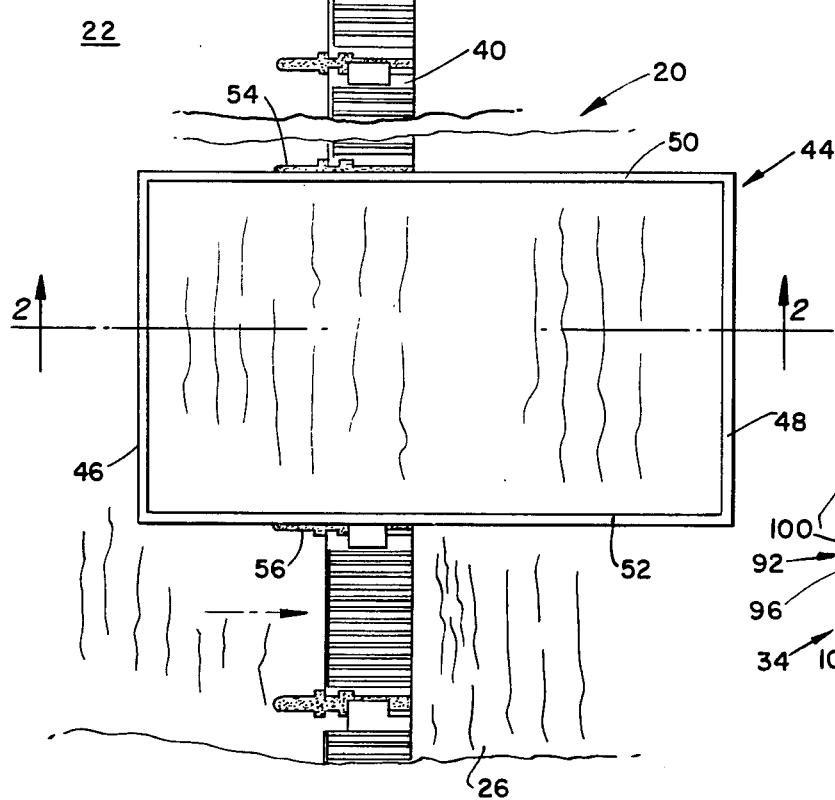
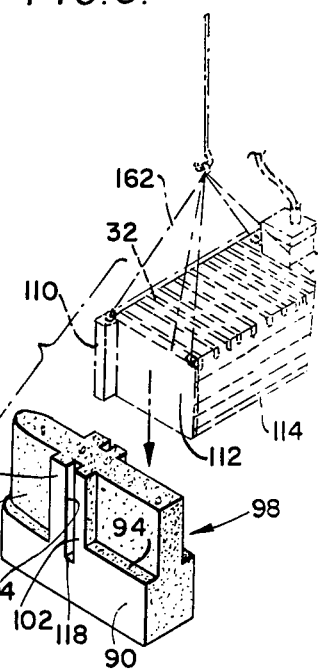
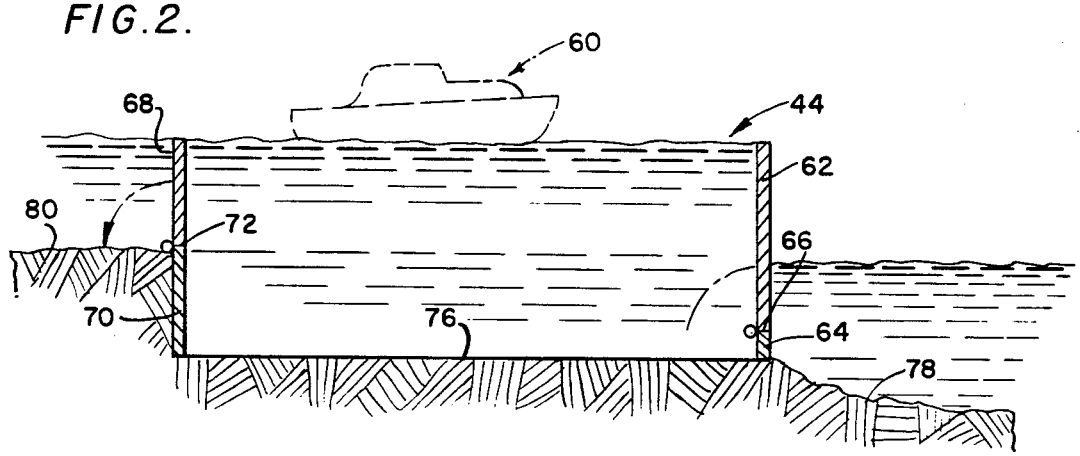

MODULAR HYDROELECTRIC POWER PLANT

BACKGROUND OF THE INVENTION

The present invention relates to prime movers, and more particularly, to prime movers which utilize water movement.

Daily, millions of gallons of water flow through the inland waterways of the United States. It has been estimated that this flow is equivalent to many millions of horsepower, which would require several million gallons of oil to produce. Therefore, the water flow through the streams and rivers of the United States represents a vast source of power, which is, and has been, virtually untapped.

The most recognizable of the prime movers which convert water flow into energy are those prime movers located adjacent high dams and/or natural waterfalls. These prime movers have proven to be quite efficient, thus showing the potential of water flow as a power source. However, prime movers associated with waterfalls and high dams require that those prime movers either be at remote locations with respect to the users of the power generated, or that the natural flow, or runoff, of the water be interrupted to a significant degree. Thus, high dams require that the flow of water in a waterway be stopped to a point where thousands of acres of land become flooded, which represents a significant interruption of the natural water flow. The natural lakes created while often scenic and somewhat useful in themselves, occupy land which might be put to other useful purposes such as farming, or the like.

Because of this flooding, streams or rivers near large population centers cannot be dammed. Thus, like those using waterfalls, the prime movers associated with high dams must be located far from locations whereat the power generated is to be used. Thus, like that generated at waterfalls, the power generated by high dams must be sent over long distances to users of that power. The cost, losses and difficulties attendant such long-distance power transportation are all well known. Furthermore, high dams require that the waterway be closed (near the dam at least) to vehicular traffic. Therefore, full utilization of the power available from the runoff of the waterways of the United States requires that the flow thereof be relatively unimpeded so that the waterways near the users can be fully utilized.

Most known prime movers using turbines over which water flows to convert water movement into power are generally unitary and are constructed in situ. That is, they are formed of a single wall, or the like. Thus, each device must be made especially for the particular location where it is to be used. This customizing represents a costly process which essentially eliminates any possibility of mass producing the devices or the component parts thereof. Being unitary, failure of some component part, for example the turbine, may result in complete shutdown of the entire device.

For these reasons, the power source resulting from the utilization of flow in many, if not most, of the waterways of the United States remains unused, and hence wasted. Furthermore, because of their paucity, the size of the prime movers at high dams and waterfalls are so large that only large rivers are considsred appropriate sources of flow energy. Thus, flow energy in small streams and rivers in the United States remains an untapped power source. As above-discussed, if the flow in the small waterways can be fully utilized, a vast source of power becomes available.

Known prime movers which utilize the flow of water in a waterway, aside from the waterfalls, either interrupt the flow of vehicular traffic on the waterway, or do not make efficient use of the flow in the waterway. Thus, for example, one known device utilizes a plurality of compartments into which water is flooded and from which the water is controllably released onto a turbine wheel to turn that wheel. The power generated by the turbine is then utilized in the usual manner. The device, however, requires that many thousands of acres of land be flooded and thus significantly interrupts the flow of water in a waterway. Furthermore, the waterway is closed as a shipping route. Thus, the device suffers from the drawbacks discussed above with reference to high dams.

Other known devices locate water wheels above the surface of a waterway, and the flow of water beneath the water wheel turns that wheel to drive a turbine-generator assembly. These devices make inefficient use of water flow and thus do not produce enough power to find wide application.

Thus, known devices either do not make enough use of water flow to produce great quantities of power, interrupt flow and vehicular routes significantly, or must be placed at locations which are inconvenient to the use of the power thus generated. Furthermore, known device are generally unitary and hence cannot use parts which have been mass produced and cannot be easily removed once installed.

The device of the present invention comprises a plurality of slidably engaged modules each forming a low dam so that the device can be easily assembled and disassembled and can be located beneath the surface of water in a waterway. The water therefore undergoes an elevational change in the flow direction and the energy associated with the elevational change is added to that energy associated with water flow to efficiently produce power from movement of water in a waterway without significantly disrupting or altering the flow of that water.

SUMMARY OF THE INVENTION

The device embodying the present invention fully utilizes the flow of water in even small streams without significantly disrupting that flow or inhibiting the flow of vehicular traffic near the device.

A plurality of modules are located in a waterway, and each module comprises a frame mounted on a pier. The frame is mounted so that the module is located beneath the surface of the waterway thereby permitting water to flow thereover. A turbine wheel is connected to the frame so that water flowing over the module frame cascades downwardly in a waterfall-like manner onto the turbine wheel to turn same. A generator is mounted on the frame and connected to the turbine for rotation therewith and generates electric power. Power withdrawal means on the generator enables that power to be withdrawn and transported to a user through appropriate transportation means.

A debris catcher is located on top of the frame to prevent debris, such as logs or the like, from impacting a turbine wheel and damaging it. A plurality of modules, of varying sizes, can be interconnected with each other to span a waterway and fully utilize the flow of water therein. The generator is disassemblable for facilitating service thereto, and locks can be provided to assist vehicles over the low dams associated with the device.

The water cascades over the water wheel thus combining the natural flow of that water with the waterfall-like drop to fully utilized the energy associated with the water flow. Therefore, the flow energy of the water is combined with the potential energy of an elevational change to produce power. This combination of potential and flow energy in a waterway enables even small streams to provide significant amounts of energy.

There is no need to dam the waterway to any significant degree as the device combines flow energy with elevational drops to efficiently produce power. Therefore, flow in a waterway need not be significantly disrupted. Thus, little or no flooding of contiguous land results from insertion of the low dams associated with the present device into a waterway, and it can therefore be positioned in a wide variety of locations. Vehicles can easily be moved over the small dams associated with the present device as such vehicles need not be lifted large distances to traverse the area wherein the modules are located.

Thus, the device of the present invention can be propitiously located to fully and efficiently utilize the natural flow of water in a waterway.

OBJECT OF THE INVENTION

It is therefore a main object of the present invention to combine flow energy with an elevational drop of water in a waterway to produce power.

Another object of the present invention is to provide a prime mover which is adaptable to a wide variety of waterway sizes and locations.

A further object of the present invention is to locate the prime mover in a waterway so that movement of vehiclular traffic therein is not significantly interrupted.

Still another object of the present invention is to locate a prime mover in a waterway without significantly interrupting flow of the water therein.

Yet a further object of the present invention is to provide a prime mover which is easily assembled and disassembled.

A more specific object of the present invention is to provide a prime mover which can utilize the flow of water in small streams to produce significant amounts of power.

These together with other objects and advantages which will become subsequently apparent reside in the details of construction and operation as more fully hereinafter described and claimed, reference being had to the accompanying drawings forming part hereof, wherein like numerals refer to like parts throughout.

BRIEF DESCRIPTION OF THE DRAWINGS

FIG. 1 is a plan view of the device embodying the teachings of the present inveniton;

FIG. 2 is an elevational sectional view taken along line 2—2 of FIG. 1;

FIG. 3 is an exploded perspective view of a module embodying the teachings of the present inveniton;

DETAILED DESCRIPTION OF THE PREFERRED EMBODIMENT

Figure 4:
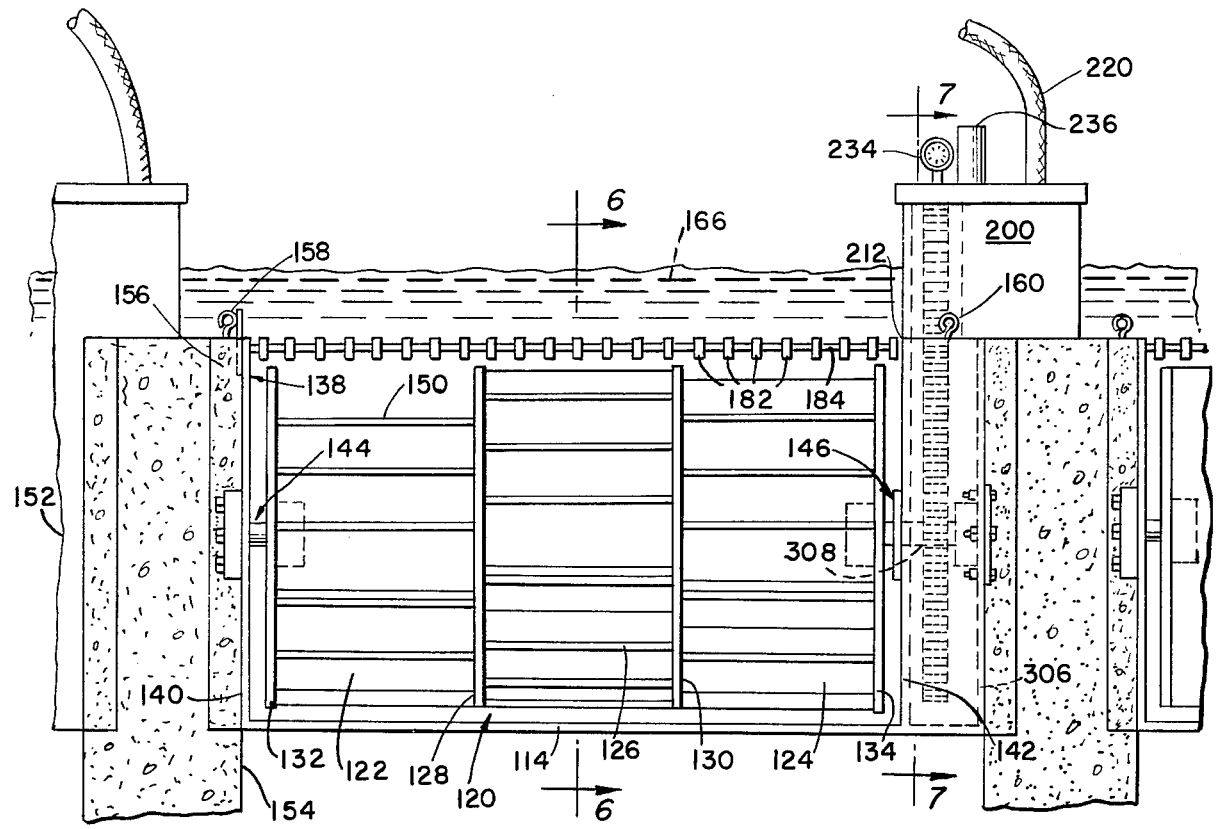
FIG. 4 is an elevational end view of a module embodying the teachings of the present invention.

Shown in FIG. 1 is an apparatus 20 for converting the flow in stream 22 having banks 24 and 26 into electric power. The device comprises a plurality of mating modules 30, each having an upstream wall 32 engaged on piers 34 and extending downstream in stream 22. The flow direction of the water in stream 22 is indicated by arrows 36, and the modules 30 are connected to piers 34 so that the modules are located beneath the surface of the water in stream 22. Generators 38 are associated with turbines in the modules for converting the flow of water in the stream 22 into electric power. The generators are mounted on the module frames 40 and are also supported by the piers 34 which partition and separate the modules. A lock 44 is located between banks 24 and 26 and serves to transport vehicles moving on stream 22 over the low dams associated with apparatus 20. The lock 44 comprises upstream wall 46, downstream wall 48, and side walls 50 and 52. Connected to side walls 50 and 52 are lock mounting means 54 and 56, respectively, for connecting those modules located adjacent the lock to that lock.

FIG. 2 shows a vessel 60 traversing lock 44. The lock is sized to accommodate the expected vehicle sizes and is located in stream 22 to be convenient to the expected shipping routes or a plurality of locks can be located in large rivers. The lock is quite simple and is used to allow traffic to traverse the device without undue interferrence. As shown in FIG. 2, upstream lock door 62 is hingably connected to upstream base 64 by hinge 66, and downstream lock door 68 is hingably connected to downstream base 70 by hinge 72.

The lock can be located in a natural shelf in a river, or can be located on a plateau 76 created between an upstream bottom 78 and a downstream bottom 80 to support the lock.

As shown in FIG. 2, the elevational change between upstream portion 82 and downstream portion 84 of the waterway is not great as the dams associated with apparatus 20 are low dams. Therefore, the flow in stream 22, or other such waterway, is not interrupted to a degree wherein many acres of contiguous land upstream of the apparatus are flooded which would represent a significant degree of interruption of the flow in the stream or waterway.

Lock 44 is operated in the usual manner to move vessel 60 from upstream portion 82 to downstream portion 84, or vice versa.

One of the piers 34 is best shown in FIG. 3, and comprises a base 90 which is set in the bottom of the stream. In the preferred embodiment, the piers 34 are fabricated of concrete, and have an upper portion 92 which is bullet like in shape and forms with base 90 a ledge 94. The upstream end 96 is curved and the downstream end 98 is flat. Ribs 100 and 102 are spaced apart and extend upwardly from ledge 94 to form groove 104 on each side of the pier 34 to receive runners, or flanges 110 of the module upstream wall 32. The module has a side wall 112 and a bottom 114 which engages flange 94 to seat the module on the piers 34. A portion of the bottom 114 beneath flange 110 engages base 118 of the groove 104.

The upstream end 96 of the piers 34 are bullet shaped so that they create only minor disturbances in the flow patterns of the water flowing through apparatus 20 while securely mounting and holding the modules in place. Other shapes for the piers 34 can also be used.

As shown in FIG. 1, lock mounting means 54 and 56 each are shaped similarly with piers 34, and if taken together, would form a single pier.

Figure 5:
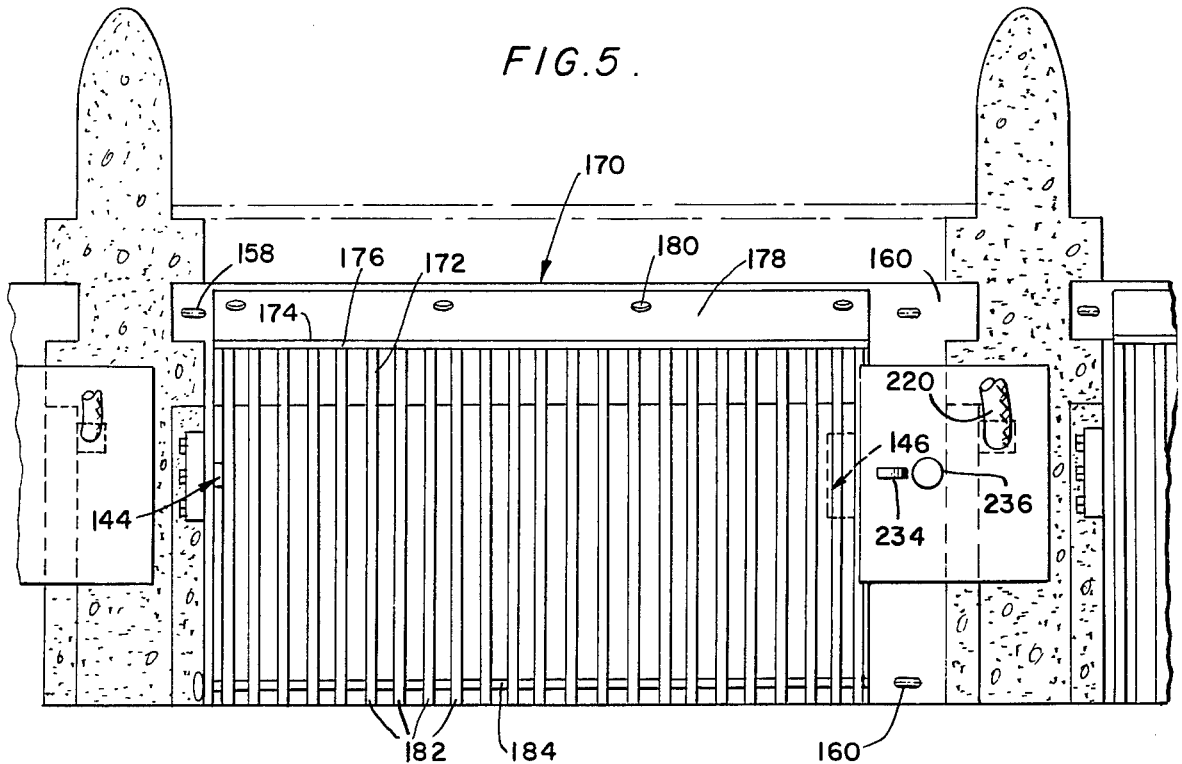
FIG. 5 is a plan view of the module shown in FIG. 4.

The module is best shown in FIGS. 4 and 5. As shown in FIG. 4, the module comprises a turbine wheel 120. The turbine wheel 120 is articulated and comprises end sections 122 and 124 and center section 126 joined to the end sections by separators, or partitions 128 and 130 respectively, with end discs 132 and 134 form the outside ends of the turbine wheel 120. The turbine wheel 120 is mounted to a turbine frame 138 which is rectangular and is open in the downstream direction and comprises end walls 140 and 142 to which the turbine wheel 120 is mounted by mounting means 144 and 146, respectively. The mounting means will be discussed below. As shown in FIG. 4, the turbine sections each comprise a plurality of turbine blades 150 which are oriented in parallelism with each other and with centerline 152 of the turbine wheel 120. The blades 150 are sized and spaced apart to provide the desired rotational speed to the turbine to produce the desired amount of power from the apparatus 20. As seen in FIG. 4, the blades of the turbine sections are staggered to produce a uniform rotation of the turbine wheel 120 even though the water cascading thereover is not flowing uniformly.

Figure 6:
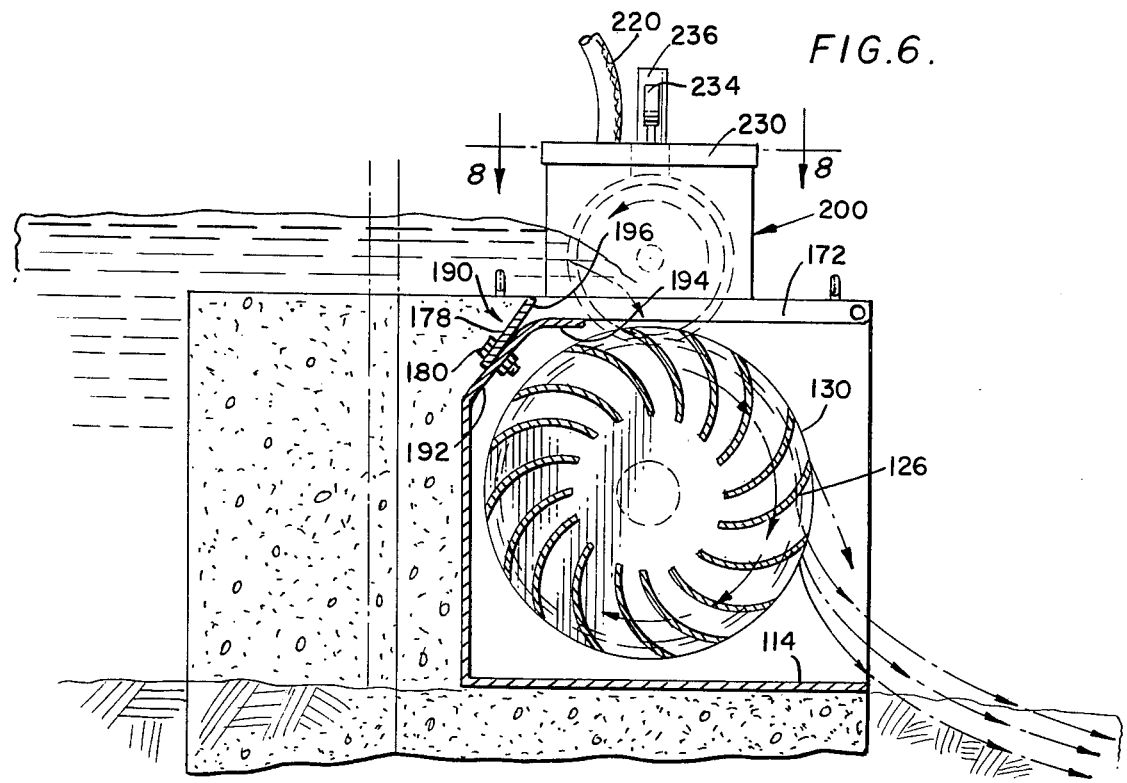
FIG. 6 is an elevational view of a turbine wheel assoicated with the module according to the teachings of the present invention.

As shown in FIG. 6, the turbine blades 150 are curved upwardly with respect to the direction of wheel rotation shown by arrows 152 in FIG. 6.

As shown in FIG. 4, the bottom 114 of the turbine frame 138 is located adjacent inner wall 154 of the pier base 90. Rear wall 156 of rib 102 is seen in FIG. 4, and eye bolt 158 is connected to flange 110 of the turbine frame 138. A corresponding eye bolt 160 is connected to the other flange 110 of the frame 138 so that using appropriate cables 162 (FIG. 3) and module hoist, the module can be removed from and inserted into mounting on the piers 34.

A shut-down board 166 is shown in phantom lines in FIG. 4 and is mounted on the two piers which support a module to be removed prior to removal of that module. The shut-down board 166 acts as a dam to divert water to the other modules so that a particular module can be removed from and inserted into the position shown in FIG. 4 without undue interference from water flow through the vacant position. Once the module is properly inserted, the shutdown board 166 is removed, and normal operation is resumed. The shut-down board like the modules, forms a low dam in the stream and therefore does not significantly disrupt the flow of that stream. Therefore, significant flooding of contiguous land is not produced even if all of the modules are removed and shut-down boards substituted therefor. Therefore, the apparatus 20, even during servicing thereof, can be used at any suitable location in a stream or river. The low dams will not significantly disrupt flow of even small streams.

As shown in FIG. 5, a debris guard 170 is located on top of the module to prevent logs or other debris from impacting the turbine blades 150 and damaging them. The debris is retained on the debris guard, and eventually removed therefrom by any suitable means. As shown in FIG. 5, the debris guard comprises a plurality of parallel spaced apart bars 172 each of which has a longitudinal centerline 174 oriented parallel with the flow direction of the water in stream 22 and having upstreams ends 176 attached to a guard reinforcement plate 178, which is attached to turbine frame 138 by bolts 180 threadably connected to upstream wall 132 of the turbine frame. The bars 72 each have a downstream end 182 connected to the turbine frame by tie-in bar 184 which is bolted to end walls 140 and 142 of the turbine frame 138. As seen in FIG. 5, the shut-down board 166 can be flushly mounted against upstream faces 186 of the pier ribs 100.

As is shown in FIG. 4, the turbine blades 150 are oriented to be perpendicularly disposed with respect to the bars 172 and with respect to the flow direction of the water in stream 22.

The bars 172 are spaced apart to capture debris which is large enough to damage the turbine blades upon impact. In the preferred embodiment, the debris guard does not retain the debris, but diverts it over the turbine wheel so that it falls on the downstream side of the turbine without contacting same. Therefore, the length of the bars is selected so that the debris will not be blown backwards by wind forces, or the like, into the turbine wheel thereby damaging it.

In the preferred embodiment, the turbine wheel is fabricated in lengths of one to four meters and having diameters from 4 to 12 feet to accommodate the flow in various sized streams and rivers. Three sections are preferred, but more can be used.

The operation of the turbine is illustrated in FIG. 6. Water flows over the top of the module and cascades downwardly through the debris guard in a sheet. The water impacts the turbine blades to turn the turbine on its mountings in the direction of arrows 152. As shown in FIG. 6, the upstream wall 32 has an upper edge 190 formed by a slanting section 192 and a horizontal downstream facing lip 194 upon which bars 172 rests. The reinforcement plate 178 is bolted to the slanting section 192 by bolts 180 and the bars 172 are welded to the plate 178, as at 196. The slanting section 192, together with the horizontal lip 194 forms a shoulder over which the water falls on route to impacting the turbine blades 150. Therefore, as shown in FIG. 6, the debris will be retained on the bars of debris guard 170 which overhangs the turbine wheel and be forced over the turbine wheel without contacting it. The debris will then fall on the downstream side of the turbine wheel.

Figure 8:
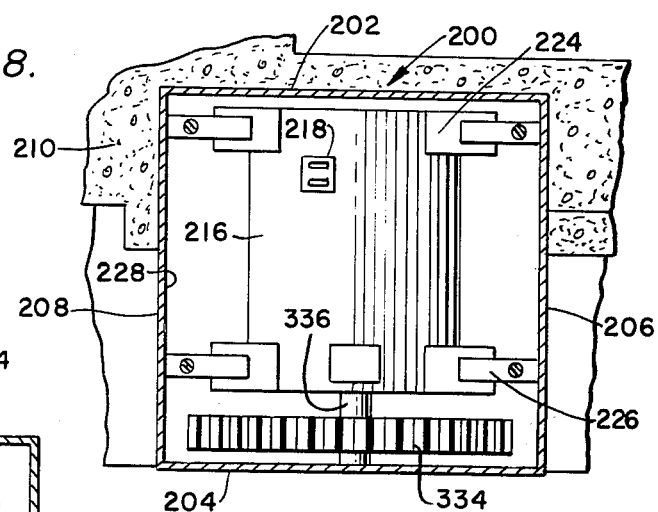
FIG. 8 is a plan view of a generator associated with the module of the present invention.
Figure 9:
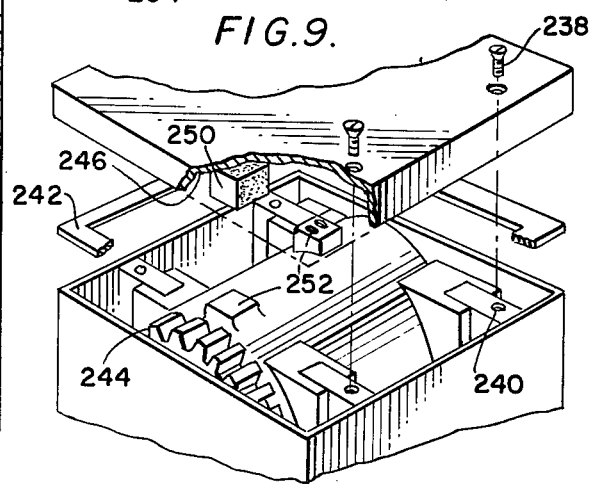
FIG. 9 is an exploded perspective view of a generator case associated with the module of the present invention; and, FIG. 10 is a detailed view of the means for mounting a turbine wheel in a module embodying the teachings of the present invention.

With reference to FIGS. 4, 8 and 9, the generator 38 is seen to comprise a generator casing 200 having an outer wall 202, and inner wall 204, a front wall 206 and a rear wall 208. Outer wall 202 and part of the front and rear walls are mounted on top surface 210 of the pier 34, and inner wall 204 is connected to end wall 142 of the turbine frame 138, as by weldment 212. The generator comprises a generator housing 216 having therein a power outlet 218 to which electric cable 220 or the like is attached to withdraw power generated by the generator. The generator housing 216 is mounted within the generator casing 200 by bracket arms 224 secured to the housing 216 and connected to the inside surface of the generator casing 200 by keys 226 which are welded to the inner surface 228 of the casing 200.

The generator casing 200 comprises a removable cover 230 having thereon a pressure guage 234 and a press rod 236, and which is attached to the casing 200 by means of holddown screws 238 which are threaded into screw holes 240 located in keys 226. A gasket 242 is interposed between the upper edge 244 of the casing 200 and the inner surface 246 of the cover 230 to assure a pressure tight fit of that cover onto the casing 200. A pressure block 250 is also attached to inner surface 246 of the cover and engages a pressure plate 252 located on generator housing 216 for cooperation therewith. In the preferred embodiment, the pressure block is urethane, and serves to properly space the cover 230 from the casing 200.

When closed, the generator casing is watertight, however the cover is easily removed therefrom to provide access to the inside of the generator casing for repairs, or the like. The keys 226 can be welded to the inner surface 228 of the generator casing and serve as guide ribs upon which yoke-like bracket arms 224 are slidably engaged. Such a mounting enables the generator to be easily inserted and removed from the generator casing 200.

Figure 7:
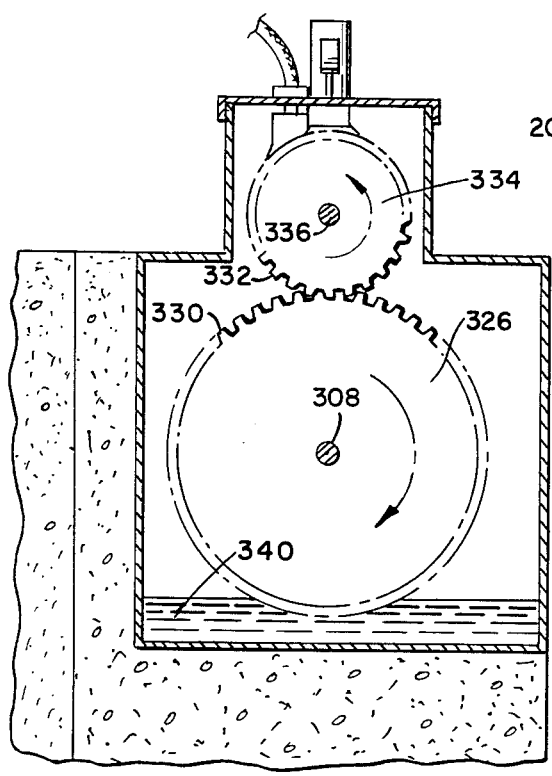
FIG. 7 is a cut-away view of a generator driving means associated with the module of the present invention.

By referring to FIGS. 4, 7 and 10, the mounting of the turbine wheel 120 and its connection to the generator can be seen. As shown in FIGS. 4 and 10, end disc 132 has a bearing box 251 mounted thereon as by weldment 253 to form a mounting cavity 255 which is axially aligned with centerline 152. Bearing means 256 are mounted in mounting cavity 255 and movably connects an axle 260 to the end disc 132. In the preferred embodiment, the bearing means 256 comprises ball bearings 262 movably connecting an inner race 264 which is attached to the axle 260 to an outer race 266 which is attached to the bearing box 251. The axle is attached at its outer end 268 to sidewall 112 of the turbine frame by locking plate 270 which is bolted to the end wall by bolts 272 and is fixedly secured to outer end 268 of the axle. Therefore, the axle 260 is located on centerline 152 and enables the turbine wheel 120 to rotate therearound as shown in FIG. 6.

End disc 134, like end disc 132, has a bearing box 276 weldably secured thereto along centerline 152 by weldments 278, or the like. The bearing box 276 therefore forms a mounting cavity 280 into which head 284 of headed axle 286 is secured as by bolts 288 for rotation with the turbine wheel 120. Headed axle 286 comprises a cylindrical body 290 extending along centerline 152 outwardly from the disc 134 and through bearing means 296 which is attached to the end wall 142 of the turbine frame 138. In the preferred embodiment, the bearing means 296 is an angular contact bearing means comprising balls 298 movably connecting an inner race 300 which is fixedly secured to body 290 to an outer race 302 which is fixedly secured to end wall 142.

As shown in FIGS. 4 and 10, the turbine frame 138 comprises a support wall 306 spaced from end wall 142, and upon which outer ends 308 of the cylindrical body 290 is movably mounted by bearing means 310 mounted in bearing box 312. The bearing box 312 comprises a locking flange 314 bolted to support wall 306, as by bolts 316, and an inwardly extending side wall 318 which receives the bearing means 310. In the preferred embodiment, the bearing means 310 comprises a pair of angular contact bearings similar to bearing means 296 and which rotatable receive outer end 308. Therefore, as the turbine wheel 120 rotates, headed axle 286 rotates therewith and is supported in cantilever fashion by end wall 142 and support wall 306.

As shown in FIGS. 7 and 10, a large gear 326 is fixedly secured to body 290 of the headed axle 286 and is located between end wall 142 and support wall 306. The large axle 326 therefore rotates with turbine wheel 120. The axle 326 comprises gear teeth 330 which meshingly engage gear teeth 332 of a small gear 334 which is fixedly secured to an axle 336 of the generator 38. Therefore, as the turbine wheel 120 rotates, the generator 38 is driven through an appropriate gear ratio by gears 326 and 334 to generate electricity in the usual manner for transportation by cable 220 to an appropriate user.

As can be seen in the Figures, the arrangement and connection of the elements to each other and to the module frame is designed to provide easy knockdown of the module while retaining a secure and rigid set up configuration. While gears are used in the preferred embodiment, other suitable connections can be used to transfer the rotation of the turbine wheel 120 to the generator 38 to produce electric power. Furthermore, in the preferred embodiment, the generator casing 200 has a pressure regulator that is actuated after the cover is in place to produce an internal pressure of 10 psi, or the like, which is registered visually on the pressure guage 234. This internal pressure is maintained to prevent water from entering the casing and contaminating oil 340 (FIG. 7) which lubricates the gears 326 and 334, and the other moving parts of the generator. Electrical contact is made or broken when the cover 230 is installed or removed respectively. Furthermore, in the preferred embodiment, the generator is of the type that develops sixty cycles frequency regardless of the speed with which it is run, so that no additional equipment is required to maintain a predetermined speed on the turbine wheel.

In large river installations, a battery of modules 26 is installed, and an overhead crane can be mounted on either the banks or the piers so that a mechanical hoist is always available to remove the unit and replace them with new ones or repair units. The modules can be connected so that the energy generated by each module is additive and combined at a single unit located on one of the banks for relay to users.

The power can be dc and transferred to ac energy at the bank located power station.

Any slight disruption of the flow in stream 22 resulting from the low dams created by apparatus 20 can be effectively used to provide irrigation, additional game fishing resouces, or the like.

As seen from the above description, all of the component parts are modular and can therefore easily be assembled and disassembled. For example, even if a major component, such as a turbine wheel, fails, the entire module can be easily removed and repaired or replaced. This modular concept is contrasted to the unitary construction of known devices which would have to be entirely shut-down should a similar failure occur. Furthermore, even the generator itself is modular and can be easily inserted and withdrawn. Such modules are also amenable to mass production.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. Apparatus for converting water movement in a stream into usable power comprising:
a plurality of supporting members spaced apart transversely of the stream and being substantially flush with the stream bed and having supporting structure guide means;
a plurality of separate, independent modules, each having a frame member located in the water and each having module guide means which are complementary to said supporting structure guide means for cooperation therewith to support said modules in said supporting structure in a manner such that said modules can be removed therefrom, said modules each being self-contained and separated from adjacent modules by said supporting members, each module further including an articulated turbine wheel rotatably attached to said frame member, a power generating means mounted on said frame member and connected to said turbine wheel for rotation therewith, and means mounted on said frame of each module for withdrawing power from said power generating means, said frame member of each module being removably mounted on said supporting structure to be beneath the surface of the water so that water flows over said frame member and cascades downwardly onto said turbine wheels to rotate same.

2. The apparatus of claim 1 wherein said supporting means guide means comprise spaced ribs on said supporting structure and said module guide means comprise flanges which slidably engage said support structure between said ribs to be held therein.

3. The apparatus of claim 2 further including a lock so that vehicular traffic moving on the water can pass over said modular frame.

4. The apparatus of claim 3 wherein said connection between said generating means and said turbine wheel includes a first gear connected to said turbine wheel for rotation therewith and a second gear connected to said generating means and meshing with said first gear for rotation therewith.

5. The apparatus of claim 4 wherein said supporting members each include a pier mounted on said stream bed.

6. The apparatus of claim 5 wherein said generating means includes an electrical generator and a generator case encasing said electrical generator and having a cover removably mounted thereon so that said electrical generator is accessible from outside said generator case.

7. The apparatus of claim 6 further including means on said cover for engaging said electrical generator to maintain a predetermined spacing between said electrical generator and said cover.

8. The apparatus of claim 7 wherein each module further includes a debris guard mounted on top of said frame to catch debris in the water to prevent said debris from contacting said turbine wheels.

9. The apparatus of claim 8 further including supporting structures engaging the banks of the stream and engaging one side of said modular frames for mounting same.

10. The apparatus of claim 9 further including a backing member associated with said frame for damming the flow of water when said module is removed from said supporting members.

11. The apparatus of claim 10 wherein said generator case cover is adjustably mounted on said generator case.

12. The apparatus of claim 11 further including means for slidably mounting said electrical generator inside said generator case so that said electrical generator can be removed from said case.

13. Apparatus for converting water movement in a stream into usable power comprising:
a plurality of supporting members spaced apart transversely of the stream and being substantially flush with the stream bed and having supporting structure guide means;
a plurality of separate, independent modules, each having a frame member located in the water and each having module guide means which are complementary to said supporting structure guide means for cooperation therewith to removably support said modules in said supporting structure in a manner such that said modules can be removed therefrom, said modules each being self-contained and separated from adjacent modules by said supporting member, each module further including an articulated turbine wheel rotatably attached to said frame member, each of said turbine wheels including a plurality of sections and partitions connecting adjacent sections together at the ends thereof, each section having a plurality of turbine blades with blades in one section being staggered with respect to blades in adjacent sections to be in spaced parallelism therewith for producing uniform rotation of said turbine wheel, a power generating means mounted on said frame member and connected to said turbine wheel for rotation therewith, and means mounted on said frame of each module for withdrawing power from said power generating means, said frame member of each module being mounted on said supporting structure to be beneath the surface of the water so that water flows over said frame member and cascades downwardly onto said turbine wheels to rotate same.

14. The apparatus of claim 13 wherein the water in the stream flows in only a single direction.

15. The apparatus of claim 13 wherein said turbine wheels are located beneath the surface of the water in the stream.

* * * * *